United States Patent [19]

Campbell

[11] Patent Number: 5,778,934
[45] Date of Patent: Jul. 14, 1998

[54] DEBRIS CAP

[75] Inventor: Lucky Campbell, Phoenix, Ariz.

[73] Assignee: S.W. Services, Phoenix, Ariz.

[21] Appl. No.: 740,434

[22] Filed: Oct. 29, 1996

[51] Int. Cl.⁶ ............................................ F16L 55/11
[52] U.S. Cl. ........................................ 138/89; 138/89.4
[58] Field of Search ........................... 138/89, 94, 89.4; 220/725, 210

[56] References Cited

U.S. PATENT DOCUMENTS

| | | | |
|---|---|---|---|
| 854,986 | 5/1907 | DeWeese | 138/89 |
| 3,820,682 | 6/1974 | Davella | 138/89 |
| 4,519,519 | 5/1985 | Meuschke et al. | 138/89 |
| 4,921,123 | 5/1990 | Mizioch | 138/89 |
| 5,029,614 | 7/1991 | Lara et al. | 138/89 |
| 5,171,514 | 12/1992 | Veronesi et al. | 138/89 |
| 5,293,905 | 3/1994 | Friedrich | 138/89 |
| 5,439,130 | 8/1995 | Waugh | 138/89 |
| 5,522,432 | 6/1996 | Radant et al. | 138/89 |

*Primary Examiner*—David Scherbel
*Assistant Examiner*—James F. Hook
*Attorney, Agent, or Firm*—Cahill, Sutton & Thomas P.L.C.

[57] ABSTRACT

The debris cap includes a handle activated retainer mechanism for retaining the cap in a pipe in which it is installed. The retainer mechanism includes an over-center connecting rod system for keeping the retaining mechanism in its retaining position. A barrel lock is employed to prevent unauthorized removal of the cap. A resilient flange on the body of the cap frictionally engages the wall of the pipe to support the cap as the retainer mechanism is manipulated.

6 Claims, 3 Drawing Sheets

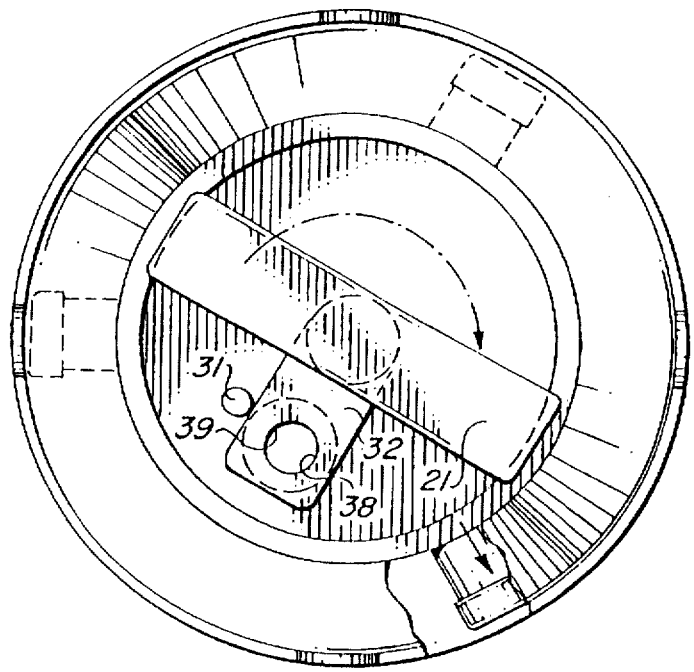
FIG. 6
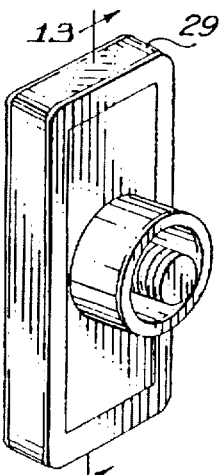
FIG. 12
FIG. 7
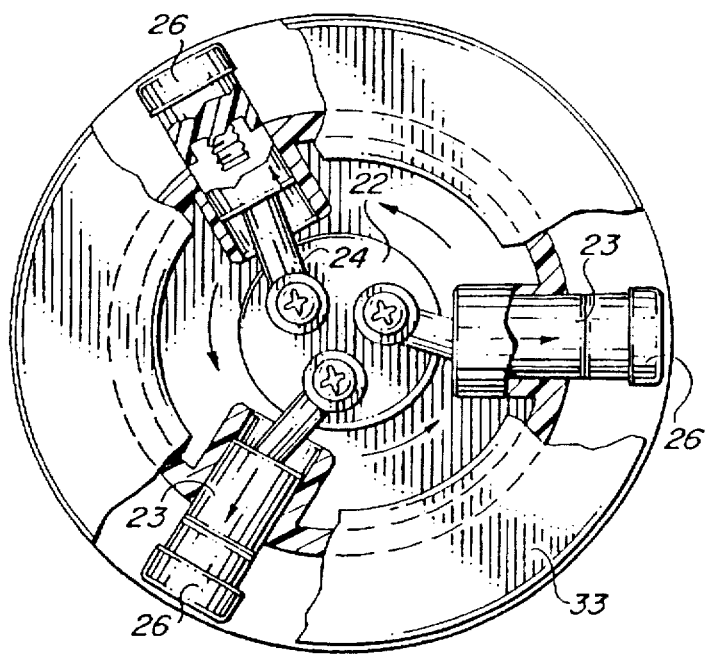
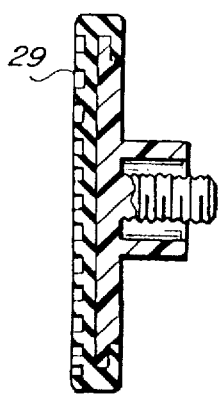
FIG. 13
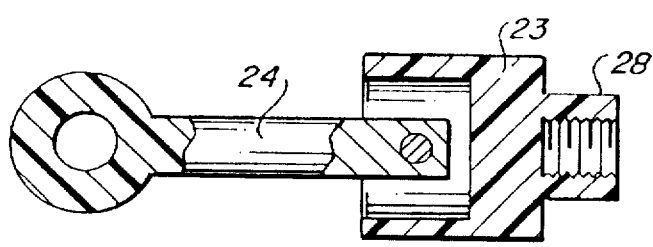
FIG. 9

5,778,934

1

DEBRIS CAP

TECHNICAL FIELD

This invention is concerned with a debris cap for closing the upper end of an access pipe to an underground shut-off valve.

BACKGROUND ART

Municipal utilities usually bury their mains under public rights of way, such as streets, at spaced intervals throughout the system. Normally open shut-off valves are incorporated for the purpose of isolating main breaks so they can be repaired.

The shut-off valves are frequently buried several feet beneath the street and access pipes are provided which extend upwardly from the valve to near street level. The access pipe provides a passage for a tool which can be manipulated from street level to actuate the valve.

A cover with a removable lid is usually incorporated into the street pavement to prevent debris from filling the access pipe. These lids usually have lift openings therein which allow some debris to pass the cover. In addition, vehicle movement and vandalism often cause the lids of these covers to be displaced and even lost. These factors allow debris to enter the access pipe and prevent or delay access to the valve. Time is important in repairing gas and water main breaks and the need to clean out an access pipe can significantly delay such repairs.

U.S. Pat. No. 4,921,123, granted May 1, 1990, to G. J. Mizioch for "DEBRIS CAP" discloses an inexpensive and easily installed debris cap for closing the upper end of an access pipe. That cap employs a cam-actuated slide for wedging the cap in place in the pipe. The cam is manipulated by means of a rotatable handle positioned atop the cap.

The ease of installation and removal of the Mizioch debris cap is both an advantage and a disadvantage. It is very helpful for legitimate installers and removers of the cap. But is also makes it easy for vandals to steal the cap and allow debris to enter the valve access pipe.

U.S. Pat. No. 5,439,130, granted Aug. 8, 1995 to G. C. Waugh discloses a debris cap similar to the one disclosed in the Mizioch patent but with provision for locking the manipulating handle to prevent unauthorized removal of the cap.

DISCLOSURE OF THE INVENTION

This invention is applicable to debris caps of the type disclosed in the Mizioch and Waugh patents and facilitates installation and retention of the debris cap in an access pipe. These caps generally comprise a hollow member with a cylindrical outer surface and a closure extending across the cylinder.

In accordance with this invention the lower edge of the cap cylinder carries an outwardly projecting flange made of resilient material. When the cap is inserted into an access pipe the resilient flange frictionally engages the inner surface of the pipe to hold the cap in place in the pipe and prevent it falling down through the pipe before the retaining mechanism is manipulated.

The retaining mechanism includes a handle manipulated drive member connected to one or more slides by means of connecting rods. The drive member is rotated to move the slides outwardly to contact the inner surface of the pipe in which the cap is installed. An over-center disposition of the connecting rods effectively prevents reverse movement of the slides when extended to retain the cap in place in the pipe.

The cap further comprises a mechanism for locking the drive member against rotation from the retaining position thereby preventing unauthorized removal of the cap from the pipe.

BRIEF DESCRIPTION OF THE DRAWINGS

The invention is described in greater detail hereinafter by reference to the accompanying drawings wherein:

FIG. 6 is a top view of the debris cap with its retaining mechanism in its retain position;

FIG. 7 is a bottom view of the debris cap shown in FIG. 6;

FIG. 9 is a sectional view through the slide and connecting rod combination taken as indicated by line 9—9 in FIG. 8;

FIG. 12 is a perspective view of another version of adjustable slide cap intended for use on debris caps to be installed in internally threaded pipes; and FIG. 13 is a sectional view of the slide cap of FIG. 12 taken as indicated by line 13—13 in FIG. 12.

BEST MODE FOR CARRYING OUT THE INVENTION

Figure 1:
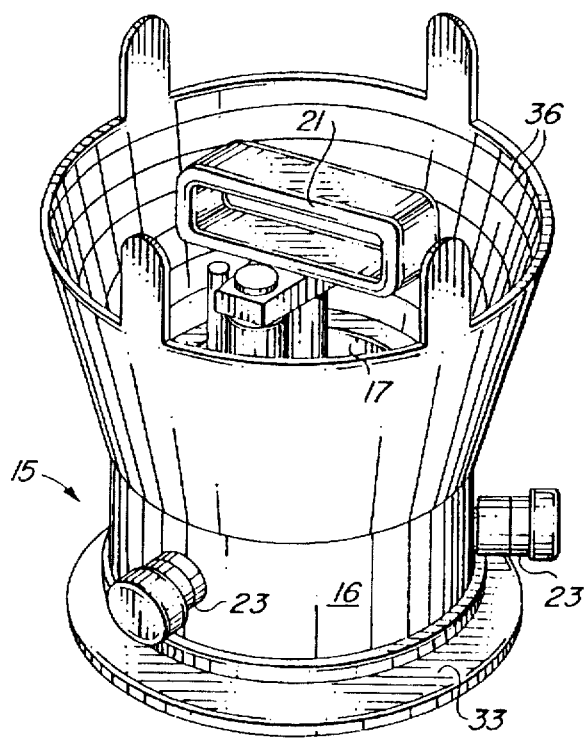
FIG. 1 is a perspective view of a debris cap incorporating this invention.

The debris cap of this invention is designated generally in the drawings by reference numeral 15. The principal components of the cap are a hollow body member 16 having a cylindrical outer surface, a closure 17 for the member, and a retaining mechanism, indicated generally by reference numeral 18, for releasably retaining the cap in a pipe 19.

The releasable retaining mechanism 18 includes a handle 21 positioned above the closure 17 for manipulating a drive member 22 positioned beneath the closure 17 and connected to one or more (in this case three) slides 23 by means of connecting rods 24. Slides 23 move radially outwardly and inwardly in cylinders 26 formed in the wall of body member 16.

Figure 4:
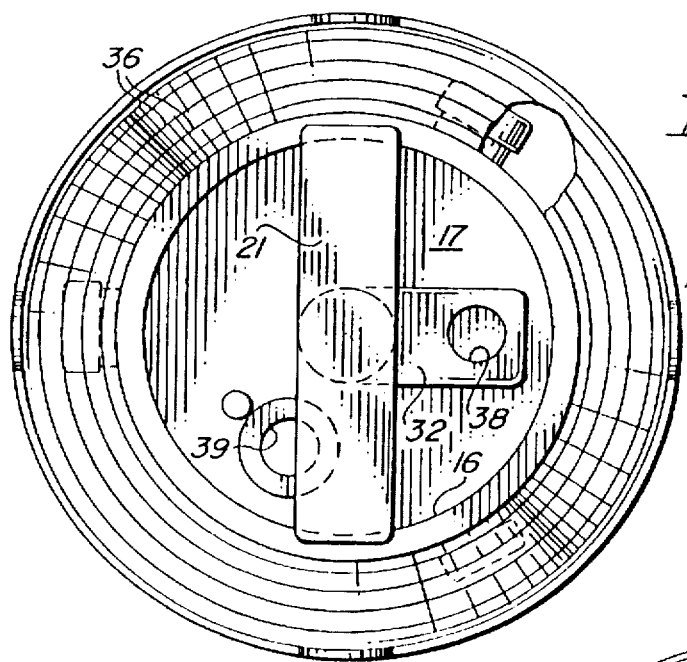
FIG. 4 is a top view of the debris cap with its retaining mechanism in its install and removal position.
Figure 5:
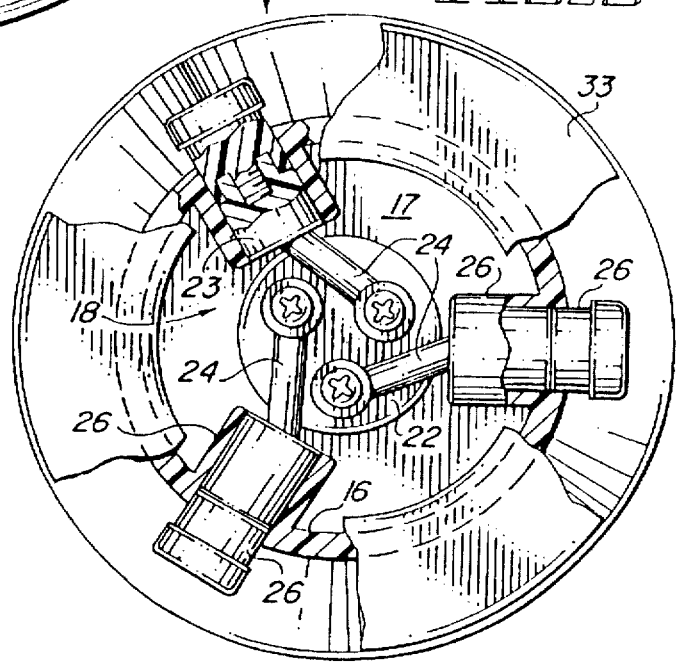
FIG. 5 is a bottom view of the debris cap shown in FIG. 4.
Figure 8:
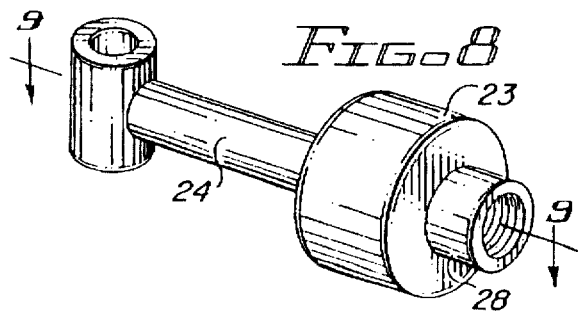
FIG. 8 is a perspective view of a slide and connecting rod combination employed in the debris cap.

Rotation of handle 21 counterclockwise as viewed from above (See FIG. 4) causes slides 23 to be retracted into body member 16 until the outer ends of the slides are flush or nearly flush with the outer surface of the body member (See FIG. 5). This is the position of the retaining mechanism 18 when the debris cap is being inserted into or being removed from the pipe.

Rotation of handle 21 clockwise as viewed from above (See FIG. 6) causes slides 23 to move outwardly of the body member 16 until the outer ends of the slides frictionally engage the inner surface of the pipe (See FIG. 7). This is the position of the retaining mechanism 18 when the cap 15 is being retained in a pipe.

The outer end of each slide 23 preferably carries an elastomer faced cap 25 for engaging the inner surface of the pipe 19. Each cap 26 preferable has an externally threaded stud 27 which is received in an internally threaded boss 22 on the end of its slide 23. This threaded connection between each cap 26 and its slide 23 permits the distance that the cap projects beyond the end of the slide to be changed by screwing the cap into or out of the slide. In effect this permits the effective length of each slide to be adjusted to compensate for variations in the internal diameter of the pipe in which the cap 15 is installed.

If the cap is to be installed in a pipe having an internal surface that it threaded, it is preferable to enlarge the surface area of the slide caps with configurations like those illustrated in FIGS. 12 and 13 for caps 29.

One desirable feature of a retaining mechanism 18 employing connecting rods 24 is that the rods can be caused to move over-center when the mechanism is in its retain position (See FIG. 7). This over-center condition in combination with a stop 31 abutting a lever 32 affixed to the handle 21 precludes the slides 23 from accidentally retracting into the cylindrical body member 16. Also, when the handle 21 is turned to extend the slides the person manipulating the handle feels a "snap" when the connecting rods 24 go over-center, signaling the person that the debris cap is in retaining condition.

The debris cap of this invention includes means for temporarily positioning and retaining the debris cap in the pipe until the retaining mechanism 18 is manipulated to firmly retain the cap in place. The pipe 19 in which a debris cap 15 is to be installed may extend several feet downwardly to the valve for which the pipe provides access. If the debris cap 15 were allowed to fall to the bottom of the pipe retrieval could be very different. Hence, the means for temporarily retaining the cap 15 in the upper region of the pipe. This retaining means comprises a fairly stiff, resilient flange 33 affixed to the lower rim of the cylindrical body member 16. Flange 33 is made from a rubber or rubber-like material and is of a diameter greater than the inside diameter of pipe 19 to frictionally contact the inner surface of the pipe 19 in which the debris cap is installed. This frictional engagement between the flange 33 and the pipe 19 is sufficient to support the weight of the debris cap 15 and hold it in position while the retaining mechanism 18 is manipulated.

Flexure of the flange 33 permits removal of the debris cap by lifting it by the handle 21.

The debris cap 15 may also have an upwardly and outwardly flared elastic skirt 34 to prevent debris from passing downwardly between the outer surface of cap body member 16 and the pipe 16. Because of the upward flare of skirt 34 and the light contact between the upper rim of the skirt and the pipe the skirt is not capable of supporting the weight of the debris cap 15 in the pipe as the flange 33 is capable of doing.

Skirt 34 may have a series of spaced, circumferential score lines 36 on its inner or outer surface for the purpose of guiding cuts in the skirt to size it to smaller diameter pipes.

Figure 3:
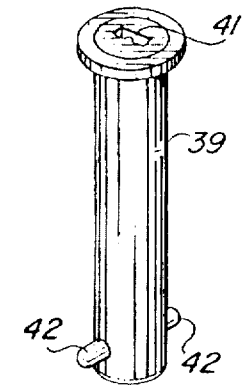
FIG. 3 is a perspective view of a barrel lock which may be employed with the debris cap.
Figure 10:
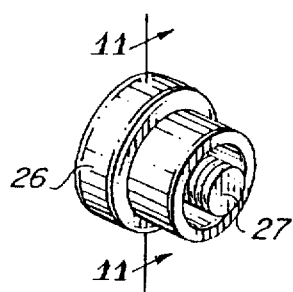
FIG. 10 is a perspective view of an adjustable cap for the slide portions of the debris cap.
Figure 11:
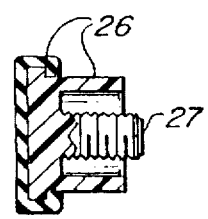
FIG. 11 is a sectional view of the slide cap taken as indicated by line 11—11 in FIG. 10.
Figure 2:
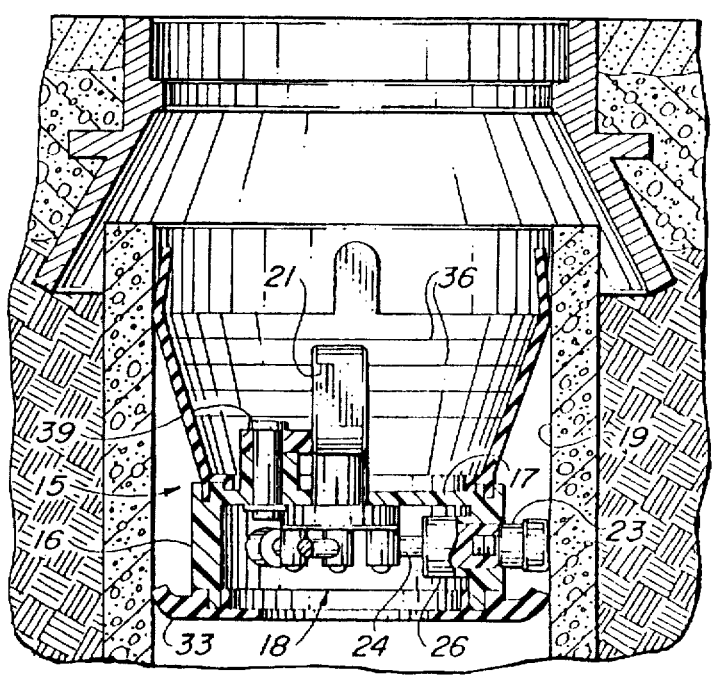
FIG. 2 is a vertical sectional view illustrating a typical installation of the debris cap of this invention.

Finally, as pointed out in the Waugh patent identified above, it is desirable to provide for a key activated lock to be incorporated in the retaining mechanism to prevent unauthorized removal of the debris cap. In accordance with this invention an aperture 37 in handle lever 32 lines up over a similarly sized aperture 38 in the closure 17 to receive a barrel lock 39 (See FIGS. 2 & 3). Insertion of a key (not shown) into a key hole 41 permits locking pins 42 to be withdrawn into the interior of the barrel lock for installation and removal of the lock from the debris cap. With the key removed the pins 42 extend outwardly from the body of the lock and prevent removal of the lock from apertures 38 and 39. The handle 21 is thus locked against rotation away from the retaining position.

From the foregoing it should be apparent that the debris cap of this invention possesses a number of desirable features.

What is claimed is:

1. A debris cap for closing one end of a pipe, said cap comprising a hollow body member having a cylindrical outer surface slightly less in diameter than the inner diameter of the pipe, a closure for the hollow member, a slide having inner and outer ends mounted for reciprocal radial movement in said member, the outer end of said slide being extendable beyond the outer surface of said member to engage the inner surface of the pipe, a drive member mounted on said closure for rotation with respect to the hollow member, means connecting said drive member to said slide whereby rotation of said drive member effects reciprocation of said slide, a handle for manipulating said drive member, and a resiliently deformable member affixed to the body member and extending outwardly therefrom to frictionally engage the inner surface of the pipe when the cap is first inserted into the pipe to temporarily retain the cap in position in the pipe until the handle can be turned to extend the slide to engage the inner surface of the pipe.

2. The debris cap of claim 1 wherein said means connecting said drive member to said slide is a connecting rod which goes over-center when said slide is extended to contact the inner surface of the pipe, and a stop for preventing further rotation of the drive member at the over-center position.

3. The debris cap of claim 2 further comprising means for releasably locking said drive member against rotation in the over-center position.

4. A debris cap for closing one end of a pipe, said cap comprising a hollow body member having a cylindrical outer surface slightly less in diameter than the inner diameter of the pipe, a closure for the hollow member, a slide having inner and outer ends mounted for reciprocal radial movement in said member, the outer end of said slide being extendable beyond the outer surface of said member to engage the inner surface of the pipe, a drive member mounted on said closure for rotation with respect to the hollow member, a connecting rod connecting said drive member to said slide whereby rotation of said drive member effects reciprocation of said slide, the arrangement being such that said connecting rod goes over-center when said slide is extended to contact the inner surface of the pipe, and a stop for preventing further rotation of the drive member at the over-center position.

5. The debris cap of claim 4 further comprising means for releasably locking said drive member against rotation in the over-center position.

6. The debris cap of claim 4 further comprising an adjustable region at the outer end of said slide permitting adjustment of the length of the slide.

* * * * *